(12) United States Patent
Wellington et al.

(10) Patent No.: US 7,843,911 B2
(45) Date of Patent: *Nov. 30, 2010

(54) DATA GROUPING APPROACH TO TELEPHONE NUMBER MANAGEMENT IN DOMAIN NAME SYSTEMS

(75) Inventors: Brian Wellington, Redwood City, CA (US); Robert Thomas Halley, Redwood City, CA (US)

(73) Assignee: Nominum, Inc., Redwood City, CA (US)

( * ) Notice: Subject to any disclaimer, the term of this patent is extended or adjusted under 35 U.S.C. 154(b) by 568 days.

This patent is subject to a terminal disclaimer.

(21) Appl. No.: 11/280,528

(22) Filed: Nov. 15, 2005

(65) Prior Publication Data

US 2007/0127492 A1    Jun. 7, 2007

(51) Int. Cl.
*H04L 12/56* (2006.01)
(52) U.S. Cl. .................. 370/389; 709/245; 707/715
(58) Field of Classification Search .......... 370/352, 370/389, 431; 709/238, 245; 707/3, 101, 707/2, 6, 102, 100, 715, 999.003; 379/219
See application file for complete search history.

(56) References Cited

U.S. PATENT DOCUMENTS

| | | | | |
|---|---|---|---|---|
| 5,515,531 | A | * | 5/1996 | Fujiwara et al. ....... 707/999.003 |
| 5,544,357 | A | * | 8/1996 | Huei .............................. 707/2 |
| 5,757,900 | A | | 5/1998 | Nagel et al. |
| 5,870,464 | A | * | 2/1999 | Brewster et al. ............ 379/219 |
| 6,081,584 | A | | 6/2000 | Hidaka |
| 6,262,987 | B1 | | 7/2001 | Mogul |
| 6,266,660 | B1 | * | 7/2001 | Liu et al. ........................ 707/3 |
| 6,310,948 | B1 | | 10/2001 | Nemeth |
| 6,643,707 | B1 | | 11/2003 | Booth |
| 6,748,057 | B2 | | 6/2004 | Ranalli et al. |
| 6,834,302 | B1 | | 12/2004 | Harvell |
| 7,027,582 | B2 | | 4/2006 | Khello et al. |
| 2002/0029217 | A1 | * | 3/2002 | Huang ........................ 707/100 |
| 2002/0029229 | A1 | | 3/2002 | Jakopac et al. |
| 2002/0143984 | A1 | | 10/2002 | Hudson |
| 2003/0009591 | A1 | | 1/2003 | Hayball et al. |
| 2003/0039241 | A1 | * | 2/2003 | Park et al. ................... 370/352 |
| 2003/0074461 | A1 | | 4/2003 | Kang et al. |
| 2003/0093592 | A1 | | 5/2003 | Allison |
| 2003/0128693 | A1 | * | 7/2003 | Segal ......................... 370/352 |
| 2003/0212821 | A1 | * | 11/2003 | Gillies et al. ................ 709/238 |
| 2004/0003114 | A1 | * | 1/2004 | Adamczyk ................... 709/245 |
| 2004/0111530 | A1 | | 6/2004 | Sidman |
| 2004/0148284 | A1 | * | 7/2004 | Baker ............................ 707/6 |

(Continued)

FOREIGN PATENT DOCUMENTS

WO   WO 2004/075012 A2    9/2004

*Primary Examiner*—Kwang B Yao
*Assistant Examiner*—Jeffrey M Rutkowski
(74) *Attorney, Agent, or Firm*—Gard & Kaslow LLP (57) ABSTRACT

Systems and methods of storing DNS data associated with a telephone number are presented. These systems and methods can reduce storage space needs, increase access speed and/or result in other benefits, in comparison with the prior art. In some embodiments, DNS data is indexed using a numerical representation of a telephone number rather than an alphanumeric representation. In some embodiments, DNS data associated with several different telephone numbers are grouped together within a single DNS data record and indexed using a secondary key. In some embodiments, DNS data is compressed.

12 Claims, 6 Drawing Sheets

U.S. PATENT DOCUMENTS

| | | |
|---|---|---|
| 2004/0148301 A1* | 7/2004 | McKay et al. .............. 707/101 |
| 2004/0210672 A1* | 10/2004 | Pulleyn et al. .............. 709/245 |
| 2004/0243596 A1 | 12/2004 | Lillqvist |
| 2004/0267907 A1 | 12/2004 | Gustafsson |
| 2005/0015374 A1 | 1/2005 | Reinauer et al. |
| 2005/0114367 A1 | 5/2005 | Serebrennikov |
| 2005/0141485 A1* | 6/2005 | Miyajima et al. ........... 370/352 |
| 2005/0182781 A1* | 8/2005 | Bouvet ....................... 707/102 |
| 2005/0220082 A1* | 10/2005 | Toyoda ....................... 370/352 |
| 2005/0226264 A1* | 10/2005 | Toyoda ....................... 370/431 |
| 2006/0101026 A1 | 5/2006 | Fukushima |
| 2007/0110049 A1* | 5/2007 | Wellington et al. ......... 370/389 |
| 2007/0110051 A1* | 5/2007 | Wellington et al. ......... 370/389 |

* cited by examiner

DATA GROUPING APPROACH TO TELEPHONE NUMBER MANAGEMENT IN DOMAIN NAME SYSTEMS

CROSS-REFERENCE TO RELATED APPLICATIONS

This application is related to U.S. patent application Ser. No. 11/280,437, entitled "Numeric Approach to Telephone Number Management in Domain Name Systems," filed on Nov. 15, 2005, and related to co-pending U.S. patent application Ser. No. 11/280,139 entitled "Data Compression Approach to Telephone Number Management in Domain Name Systems," filed on Nov. 15, 2005, the disclosures of which are both hereby incorporated herein by reference.

BACKGROUND

1. Field of the Invention

The invention is in the field of computer networks, and more specifically in the field of domain name services.

2. Related Art

The use of computer networks is expanding to include services that would previously have been associated with telephone networks. These services include, for example, voice-over-internet-protocol (VoIP) communications. As such, it is sometimes desirable to store telephone numbers in domain name system (DNS) data.

Standards have been proposed for storage of telephone numbers in DNS data or in association with DNS data. For example, a specification (RFC 3761) proposed by the Internet Engineering Task Force (IETF) describes a mechanism for storing telephone numbers using a fixed mapping between a telephone number and a domain name. In the IETF specification, a telephone number such as 1650 381 6000 is represented as a domain name as 0.0.0.6.1.8.3.0.5.6.1.e164.arpa. The number is reversed and each digit is treated as a separate DNS label. A higher level domain name, e.g., "e164.arpa," is appended to the string of DNS labels representing the telephone number. In order to maintain conformity with other DNS labels, the IETF specification maintains the tradition that each DNS label comprises alphanumeric case insensitive characters.

There are a number of problems that can result from the above strategy. For example, each DNS label requires two bytes of data for storage to hold an alpha numeric representation of each digit. Thus, an eleven-digit telephone number requires 22 bytes of data storage to hold an alphanumeric representation of the telephone number digits, as well as further storage for higher level parts of the domain name. Each DNS label is also treated as a case insensitive alphanumeric and must be individually searched as such. Further, in a typical implementation, for each data record there are approximately 28 bytes of overhead data and 100 bytes of NAPTR (naming authority pointer) data related to the domain indexed by the data. NAPTR data may include IP addresses, protocols, telephone numbers, or the like. The storage requirements for overhead data and NAPTR data are implementation dependent.

Figure 1:
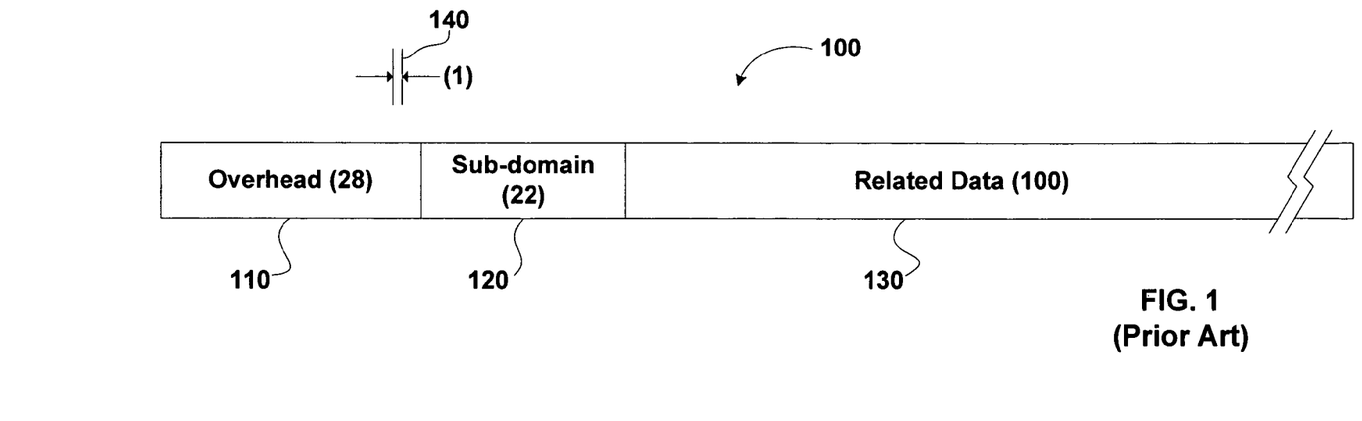
FIG. 1 is an illustration of a prior art DNS record.

An example of a prior art DNS record (i.e. database record including DNS data), generally designated 100, is illustrated in FIG. 1. Approximately 28 bytes of Overhead Data 110 are associated with each DNS Record 100. For illustrative purposes, the approximate size of each field within DNS Record 100 is shown as a number in parentheses and a Scale 140 is included to show the size of one byte in each figure. A Sub-domain Data 120, representative of an eleven-digit telephone number, requires 22 bytes, and Related Data 130 (e.g., NAPTR data, "A" or "AAAA" DNS data related to the specific sub-domain) may take 100 bytes. Sub-domain Data 120 is typically interpreted relative to a higher level domain label and thus is typically a "relativized" sub-domain. One hundred and fifty bytes are thus required for each DNS record indexed by Sub-domain 120. When space is also used for the domain name, storage of 200 million phone numbers may take up to 30 Gigabytes of data. A database of this size is more practically stored in a storage device such as a hard drive than in local memory (e.g., DRAM). As a result, database of this size would significantly inhibit the operation of domain name services because accessing a hard drive takes a substantially longer time than accessing local memory. Further, these longer access times are in conflict with the requirements of telephone systems, which have strict latency requirement in both terms of absolute response times and the standard deviation of response times. There is, therefore, a need for improved systems and methods of managing telephone number data in DNS systems.

SUMMARY

The invention includes systems and methods for managing telephone numbers in DNS. In various embodiments, these systems and methods include more efficient storage of telephone numbers and related DNS data, as compared with the prior art. These efficiencies use less storage space and/or provide faster data access.

Various embodiments of the invention include three approaches to reducing the amount of space used to store database records including telephone numbers and DNS data. These approaches may be used singly or in various combinations. A first approach includes storage of the telephone number as a numeric value rather than as alphanumeric text (e.g., ASCII character based text). A second approach includes storage of data relating to more than one telephone number within a single database record. A third approach includes compression of part of a database record.

Various embodiments of the invention include a system comprising a DNS database including a plurality of database records each including a primary key configured to identify a different particular member of the plurality of database records, a member of the plurality of database records including one or more secondary keys configured to index different DNS data within the member of the database records including a plurality of secondary keys, each of the different DNS data being related to a different telephone number, server logic configured to receive a request for DNS data, the request including a representation of a telephone number, and query logic configured to identify the member of the plurality of database records including the plurality of secondary keys using a first part of the telephone number and to identify a member of the different DNS data using a second part of the telephone number.

Various embodiments of the invention include a method comprising receiving a request for DNS data, the request including a representation of a telephone number, identifying one of a plurality of database records using a first part of the representation of the telephone number, identifying one of a plurality of DNS data within the one of a plurality of database records, using a second part of the representation of the telephone number, and returning all or part of the identified DNS data in response to the received request.

Various embodiments of the invention include a computer readable medium having stored thereupon a code segment configured to receive a request for DNS data, the request including a representation of a telephone number, a code segment configured to identify a database record from among a plurality of database records using a primary key including a first part of the telephone number, a code segment configured to identify DNS data from among a plurality of DNS data within the identified database record using a secondary key including a second part of the telephone number, and a code segment configured to process the identified DNS data.

Various embodiments of the invention include a computer readable medium having stored thereupon a first database record indexed using a first primary key representative of a first plurality of telephone numbers, the first database record including a plurality of DNS data each indexed using one of a plurality of secondary keys, each of the plurality of secondary keys being uniquely representative of one of the first plurality of telephone numbers, and a second database record indexed using a second primary key representative of a second plurality of telephone numbers.

DETAILED DESCRIPTION

The invention includes one or more approaches to including telephone numbers in DNS data. In various embodiments, the one or more approaches may improve DNS server response times and/or reduce the space used to store database records and associated DNS data. Several of these approaches are discussed further herein. These approaches may be used in various combinations.

In a first approach, referred to herein as the numeric approach, the part of a domain name including a telephone number is stored within a DNS database as a numeric value rather than as a series of alphanumeric characters. This stored value is typically used as an index to specific DNS data. Storing the telephone number as a numeric value reduces the amount of storage space used to store DNS data and the associated indexes, as compared with the prior art. Storing the telephone number as a numeric value can also increase search speed since comparing integers is typically faster than comparing alphanumeric domain names For example, the domain name "0.0.0.6.1.8.3.0.5.6.1.e164.arpa" includes a sub-domain "0.0.0.6.1.8.3.0.5.6.1" used to represent the telephone number 1650 381 6000. When used as an index, this sub-domain is compared with a representation of a telephone number received by a DNS server as part of a request for DNS services, in order to identify specific DNS data. In the numeric approach, the representation of a telephone number received as part of a request for DNS services is optionally converted from an alphanumeric representation to a numeric representation.

In the numeric approach, a sub-domain index that would normally be represented by eleven alphanumeric DNS labels requiring 22 bytes of storage is stored as a single numeric value. The single numeric value may be stored in, for example, five to eight bytes depending on the length of the stored number. An eleven-digit telephone number can be stored in five bytes and a twelve-digit telephone number (e.g., a European telephone number) can be stored in six bytes. These storage needs are substantially less than the two bytes per digit requirement of the prior art. In the numeric approach, the numeric representation of a telephone number is used to index database records, thus reducing the storage needs for DNS data. The use of a numeric value as an index can also reduce the number of comparisons needed to identify specific DNS data because each index can be examined in one numeric comparison rather than requiring a separate alphanumeric comparison for each of several DNS labels as is done in the prior art. Each numeric comparison can typically be done using a single CPU instruction.

A second approach to including telephone numbers in database records, referred to herein as the grouping approach, includes grouping data relating to several different telephone numbers into the same database record. In the grouping approach, each database record is indexed using a first part of the numeric representation of the telephone number, and a second part of the telephone number is used as a sub-index within a particular database record. In one embodiment that uses this approach, the approximately 28 bytes of overhead associated with each database record are shared among the grouped data. For example, if DNS data relating to 10 telephone numbers are grouped in the same database record, the storage space used is reduced by nine times the overhead, e.g., 9×28 or 252 bytes. This is a savings of roughly 25 bytes per telephone number. The grouping approach is optionally used in combination with the numeric approach.

A third approach to including telephone numbers in domain names, referred to herein as the compression-approach, includes compression of all or part of each database record. Compression algorithms are applied to DNS data related to each telephone number and optionally to any sub-indexes within a particular data record. The compression approach is optionally used in conjunction with the numeric approach and/or the grouping approach. As discussed further herein, the compression approach can result in a greater reduction in used storage space when used in combination with the grouping approach than when used without the grouping approach.

Figure 2:
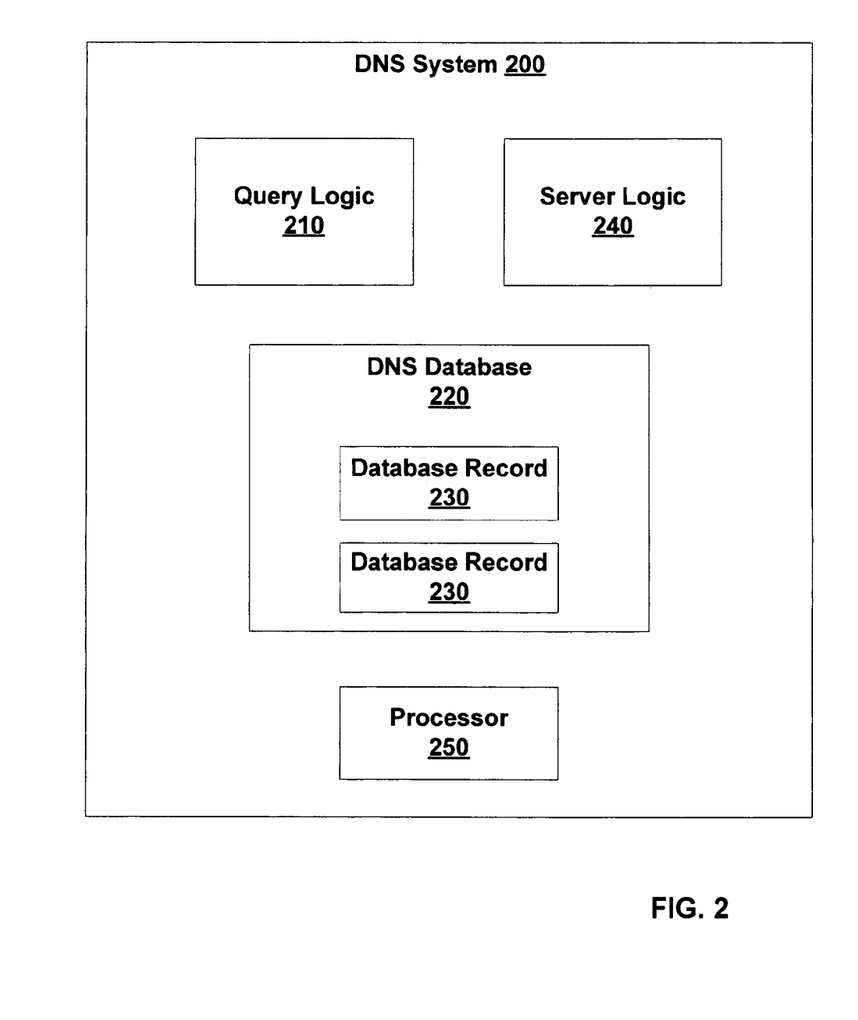
FIG. 2 is a block diagram illustrating a DNS system, according to various embodiments of the invention.

FIG. 2 is a block diagram illustrating a DNS System 200, according to various embodiments of the invention. DNS System 200 may be embodied in a single computing device configured as a DNS server or more than one computing devices configured to operate jointly as a DNS server. DNS System 200 includes Query Logic 210 configured to perform queries on a DNS Database 220. The queries executed by Query Logic 210 are generated using Server Logic 240 in response to requests for DNS services received from external devices. Query Logic 210 and Server Logic 240 are optionally executed using a Processor 250. Query Logic 210, Server Logic 240 and/or DNS Database 220 are optionally stored on a computer readable medium, such as a floppy disk, hard disk, optical memory, flash memory, random access memory, flash drive, or the like.

Query Logic 210 is software, firmware or hardware configured to execute queries on DNS Database 220. When the numeric approach is used, these queries include a numeric representation of a telephone number or part thereof. When the numeric approach is not used, these queries include an alphanumeric representation of a telephone number. The telephone number or part thereof is used to identify a specific Database Record 230 from among a plurality of Database Records 230 within DNS Database 220. Thus, the telephone number (in its entirety or part thereof), however represented, is used as a key to identify a specific database record. In embodiments including the grouping approach, queries used by Query Logic 210 may include a first part of a telephone number as a key configured to identify a specific Database Record 230. In these embodiments, a second part of the telephone number may then be used, again using Query Logic 210, to identify a specific sub-record within the identified Database Record 230.

The queries executed by Query Logic 210 on DNS Database 220 are configured to result in the retrieval of DNS data associated with a telephone number, from DNS Database 220. The retrieved data is typically NAPTR data, but can alternatively include one or more other DNS data types such as "A" or "AAAA" DNS data. For example, the retrieved data may include an IP address. All or part of the retrieved data is optionally passed on, using Server Logic 240, to an external device from which a request for DNS services was received.

In some embodiments, Query Logic 210 is configured to query DNS Database 220 using both parts of a domain name representative of a telephone number and parts of the domain name representative of other domain information. For example, given the domain name 0.0.0.6.1.8.3.0.5.6.1.e164.arpa, Query Logic 210 maybe configured to query DNS Database 220 using both "e164.arpa" and a representation of "0.0.0.6.1.8.3.0.5.6.1" as query terms. The representation of "0.0.0.6.1.8.3.0.5.6.1" will include a numeric value (e.g., 16503816000) if the numeric approach is used, while the domain labels "e164.arpa" are alphanumeric. Thus, in some embodiments, Query Logic 210 is configured to query DNS Database 220 using both numeric and alphanumeric search terms, and both numeric and alphanumeric search terms may be used in the same query.

Server Logic 240 is software, firmware and/or hardware configured to receive a request for DNS services from an external system and to respond to such requests. For example, Server Logic 240 may include logic configurable in order for DNS System 200 to operate as a DHCP (Dynamic Host Configuration Protocol) server, a referral cache, a DNS server, or the like.

DNS Database 220 includes a plurality of Database Record 230. Database Records 230 may be stored in a relational database format, a flat file, a linked list, a hash table, or other format for data record storage. Database Records 230 are keyed by a representation of a telephone number and optionally a higher level DNS label. For example, Database Record 230 may be keyed by a numeric or an alphanumeric representation of a telephone number and the domain name labels "e164.arpa." While two examples of Database Record 230 are illustrated in FIG. 2, in some embodiments, the number of Database Records 230 within DNS Database 220 may be many more (e.g., millions or hundreds of millions). Further details of Database Records 230 are discussed elsewhere herein.

Processor 250 is optionally a digital processor configured to execute Query Logic 210 and/or Server Logic 240. Processor 250 is not required when Query Logic 210 and Server Logic 240 are embodied in hardware or firmware.

Figure 3:
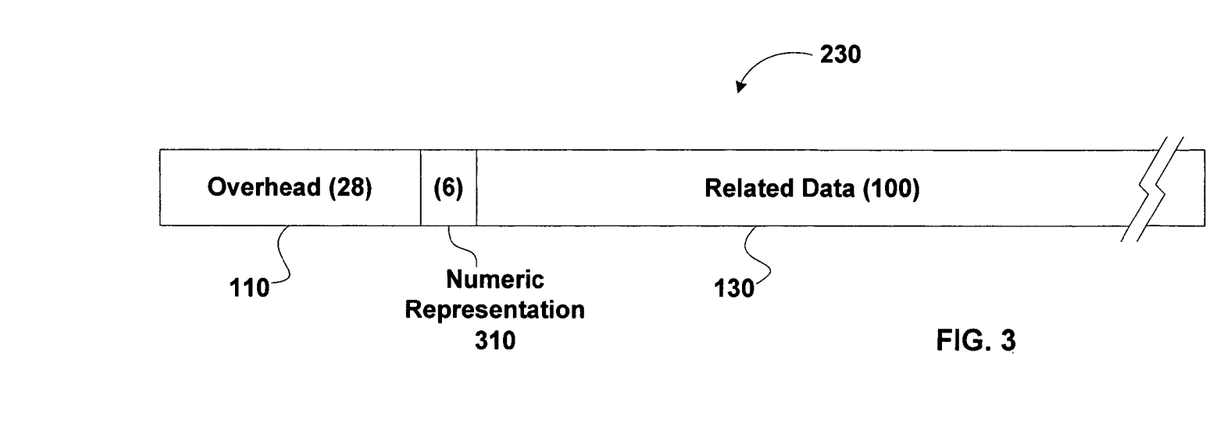
FIG. 3 illustrates a database record including a numeric representation of a telephone number, according to various embodiments of the invention.

FIG. 3 illustrates an embodiment of Database Record 230 including a numeric representation of a telephone number, as in the numeric approach. This embodiment includes Overhead 110 using approximately 28 bytes of data storage, and Related Data 130 using approximately 100 bytes of data storage. This embodiment further includes a Numeric Representation 310 of a telephone number using approximately 6 bytes of data storage. The length of Numeric Representation 310 is dependent on the length of the telephone number represented. For example, a telephone number including a country code and/or an extension may need a greater number of bytes than a telephone number including only a local prefix and number. Telephone numbers are optionally also stored with a leading or trailing non-zero digit that may affect the number of bytes used for storage. Thus, in various embodiments, the storage used for Numeric Representation 310 may be less than 20, 17, 14, 10, 7, 6, 5 or 4 bytes. For example, the storage used may be 6 bytes or 5 bytes. In embodiments where DNS System 200 is a referral cache, Numeric Representation 310 may represent only a country code and use only two bytes. In some embodiments, the storage used for Numeric Representation 310 is less than 20 bytes to store a representation of a telephone number having more than nine digits.

Database Record 230, as illustrated in FIG. 3, can be compared with DNS Record 100 as illustrated in prior art FIG. 1. As shown by these figures, approximately 16 bytes of data storage are saved for each instance of Database Record 230. This is approximately a 10 percent (16 bytes/150 bytes) savings in comparison with the prior art.

Figure 4:
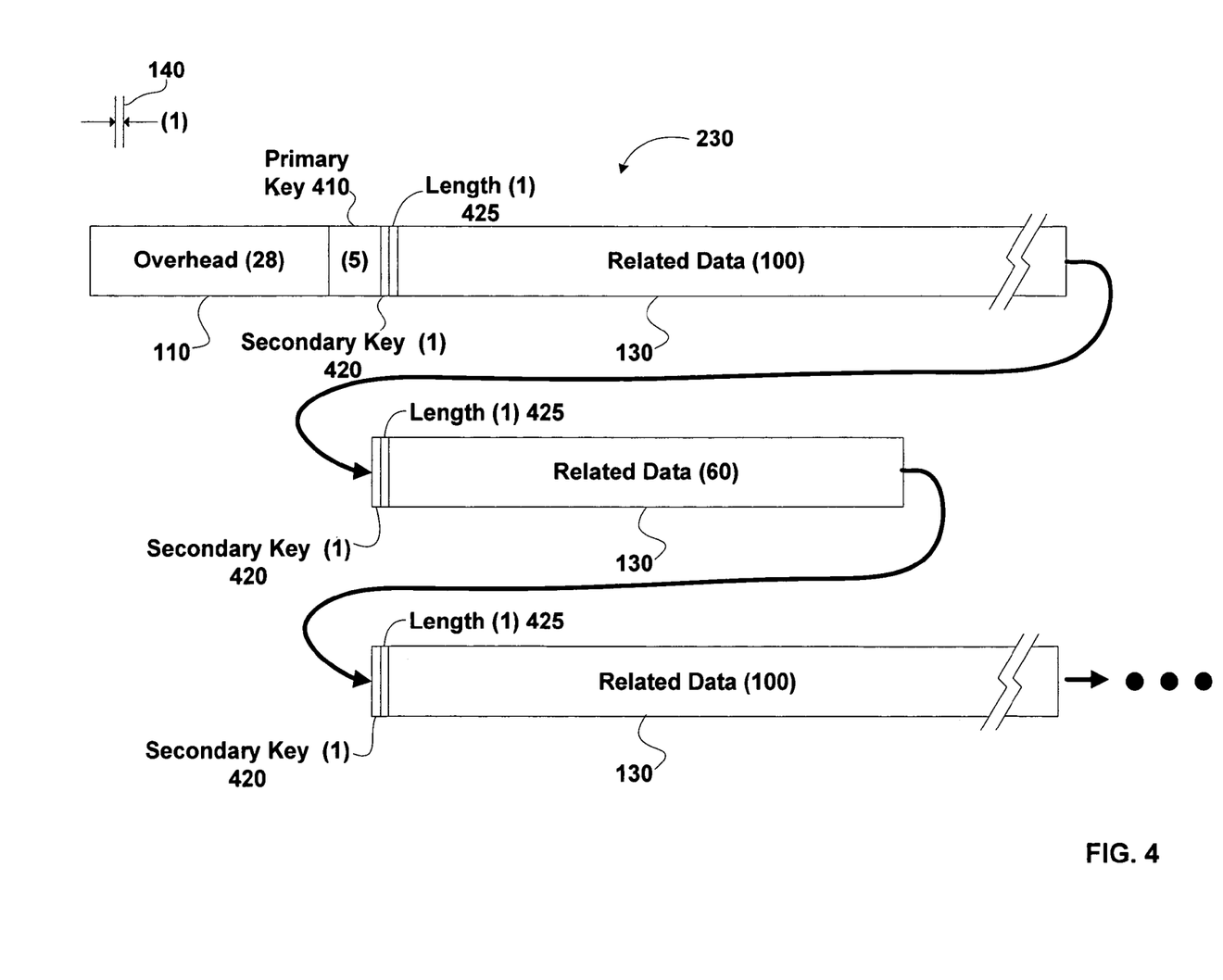
FIG. 4 illustrates an alternative database record including multiple DNS data, according to various embodiments of the invention.

FIG. 4 illustrates embodiments of Database Record 230 in which the grouping approach, in addition to the numeric approach, is used to reduce data storage usage. The grouping approach is optionally used in addition to the numeric approach. In the grouping approach illustrated by FIG. 4, several examples of Related Data 130, each associated with a different telephone number, is stored in a single instance of Database Record 230. As such, only one instance of Overhead 110 is used for storing more than one instance of Related Data 130.

The embodiments of Database Record 230 illustrated in FIG. 4 comprise a Primary Key 410 including a first part of a representation of several telephone numbers and a plurality of Secondary Key 420 each including a second part uniquely representative of one of the several telephone numbers. The terminology "first part" and "second part" are meant to indicate that there are two parts to the representation of the telephone number, and not that these parts are characterized by any specific part order. In some embodiments, the first part includes data representing eleven digits of a twelve-digit telephone number and the second part includes data representing the twelfth digit. For example, in one embodiment Primary Key 410 includes the numerical value "1650381600" and instances of Secondary Key 420 includes the numerical values "0," "1," and "2," respectively. In this embodiment, a single instance of Database Record 230 includes instances of Related Data 130 associated with the telephone numbers "16503816000," "16503816001," and "16503816002." In another example, Database Record 230 includes sixteen instances of Secondary Key 420 each including a hexadecimal value representative of one of sixteen different telephone numbers. Primary Key 410 may include, for example, 3, 4, 5, 6 or more bytes of data.

Embodiments of Secondary Key 420 having one byte of storage space can represent 256 distinct values. Thus, in these embodiments, an instance of Database Record 230 may include up to 256 instances of Related Data 130 associated with 256 different telephone numbers. In alternative embodiments, an instance of Database Record 230 includes between 2 and 255 (inclusive) instances of Related Data 130 each associated with a different telephone number. For example, various embodiments include 10, 16, 32, 64, 100 or 128 instances of Related Data 130 in a single instance of Database Record 230.

In alternative embodiments, the Primary Key 410 and Secondary Key 420 include different relative amounts of data storage. For example, Primary Key 410 may include 4 bytes of data storage and Secondary Key 420 may include 2 bytes of data storage, both may include the same amount of data storage, or Secondary Key 420 may include more data storage than Primary Key 410. In these embodiments, more than 256 instances of Related Data 130, associated with different telephone numbers, may be included in Database Record 230.

Database Record 230 optionally includes one or more data field, such as a Length 425 field, configured to store the size of Related Data 130 associated with each of the Secondary Keys 420. In various embodiments, Length 425 may comprise 1 byte, 2 bytes, 3 bytes, or more. Length 425 is optional when the size of Related Data 130 is fixed. In alternative embodiments, Length 425 includes data, such as offsets, that can be used to calculate the size of Related Data 130 rather than the size itself. As illustrated in FIG. 4, the size of Related Data 130 may vary within a particular instance of Database Record 230. In some embodiments, one instance of Length 425 is included in each instance of Database Record 230 and each instance of Related Data 130 within that particular Database Record 230 is of the same size (indicated by data stored in Length 425).

When the grouping approach is used, Query Logic 210 is configured to first identify one of the plurality of Database Records 230 included in DNS Database 220 using a first part of the representation of a telephone number. This first part is used to uniquely identify one instance of Database Record 230 by matching with the instance of Primary Key 410 in that instance of Database Record 230. The identified Database Record 230 is read and a second part of the representation of the telephone number is then used to identify a specific instance of Related Data 130 (e.g., a sub-record of Database Record 230) by matching with Secondary Key 420. Further details of this process are discussed elsewhere herein.

Figure 5:
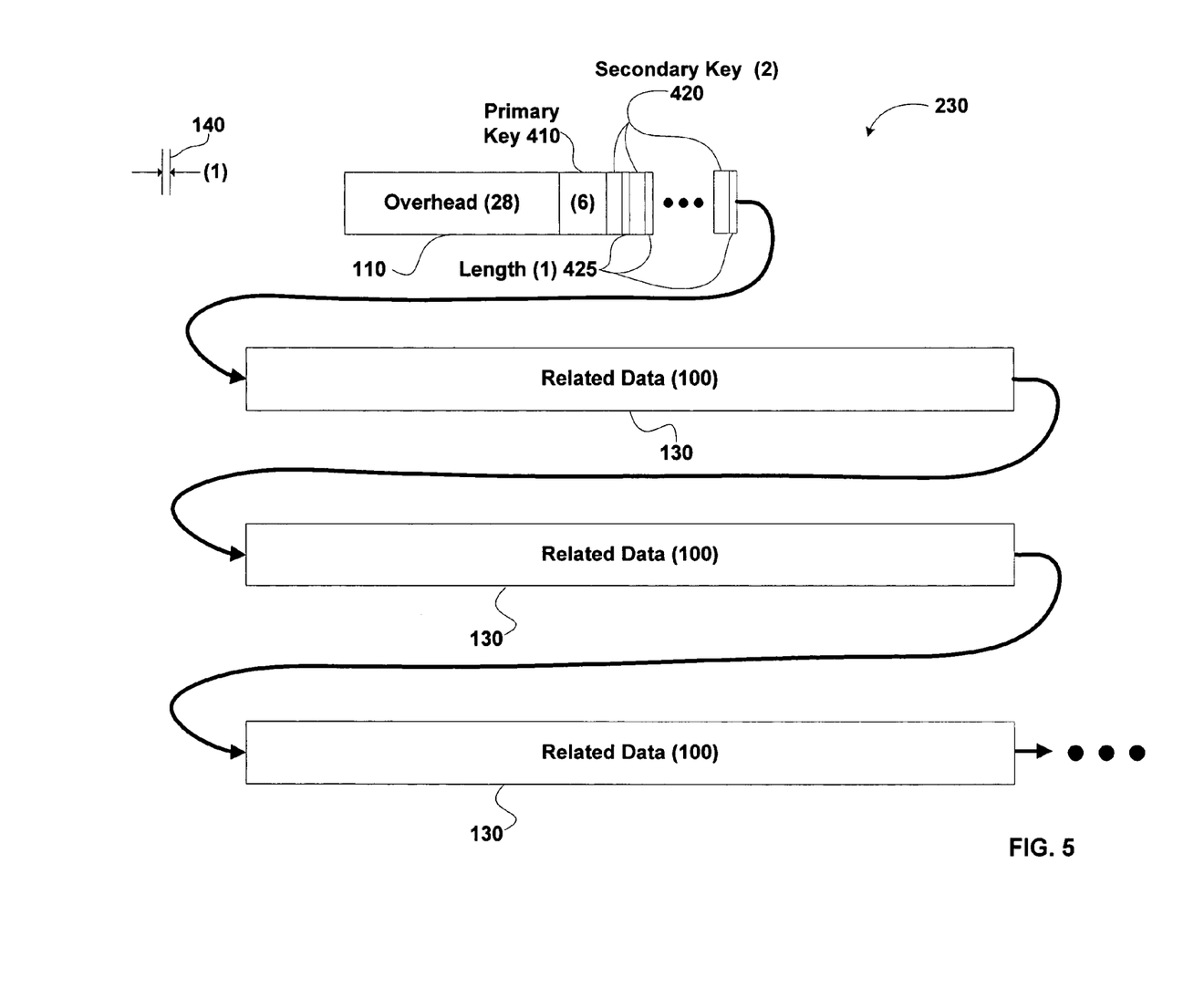
FIG. 5 illustrates an another alternative database record including multiple DNS data, according to various embodiments of the invention.

FIG. 5 illustrates alternative embodiments of Database Record 230 in which the grouping approach is used but the ordering of Secondary Keys 420 and Related Data 100 are different from that illustrated in FIG. 4. Specifically, instances of Related Data 130 within the same Database Record 230 are stored in adjacent memory. In these embodiments, Primary Key 410 includes six bytes of data, Secondary Key 420 includes two bytes of data, and Length 425 includes one byte of data. Length 425 is optionally configurable to indicate the size of the instance of Related Data 130 associated with an instance of Secondary Key 420, the number of bytes to the next instance of Related Data 130, a pointer to the next instance of Related Data 130, an offset distance to the associated instance of Related Data 130 within a data table, or the like. While three instances of Secondary Key 420, Length 425 and Related Data 130 are shown in FIG. 5, as with FIG. 4, various embodiments include different numbers of these fields. The order of Secondary Keys 420 and instances of Related Data 130 illustrated in FIG. 5 may be different. In some embodiments, the instances of Secondary Key 420, included in an instance of Database Record 230, are stored in adjacent memory.

The grouping approach can save a significant amount of storage space relative to the prior art. For example, in the embodiments illustrated by FIG. 4, where Database Record 230 includes 256 instances of Related Data 130, the 34 bytes used for Overhead 110 and Primary Key 410 are shared by 256 instances of Related Data 130. This amounts to 0.13 bytes per instance of Related Data 130. Each instance of Related Data 130 further uses approximately 100 bytes and is associated with a one-byte instance of Secondary Key 420 and optionally a one-byte instance of Length 425. Thus, as little as 102.13 bytes of storage may be used for each instance of Related Data 130 included in Database Record 230. This is a 32 percent savings in storage space in comparison with the prior art illustrated in FIG. 1.

Figure 6:
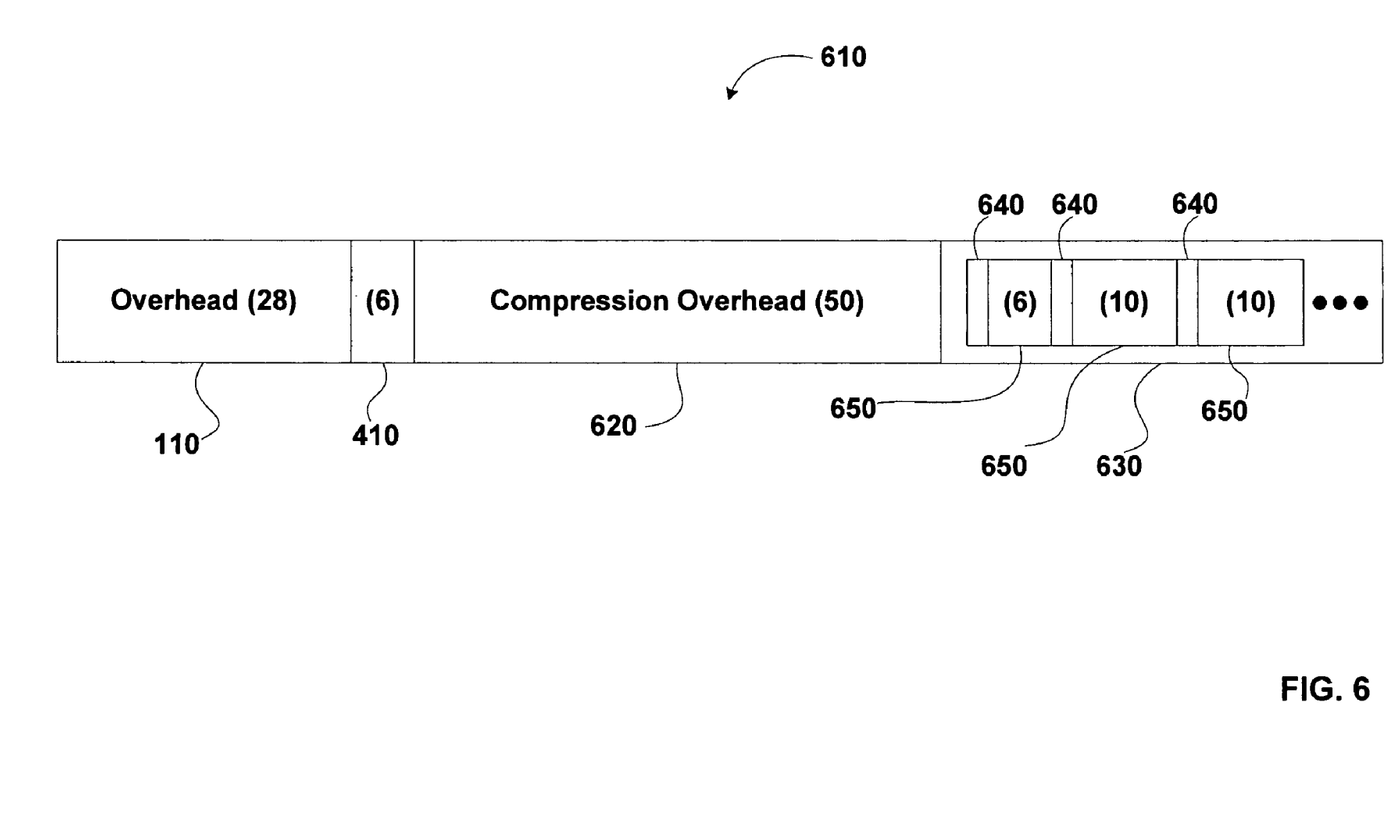
FIG. 6 illustrates an alternative database record including data compression, according to various embodiments of the invention.

FIG. 6 illustrates a Database Record, generally designated 610, including Compression Overhead 620 and Compressed Data 630, as may be found in embodiments of the invention including the compression approach. Database Record 610 is an alternative embodiment of Database Record 230 of FIG. 4.

The compression approach can be used independently from the numeric approach and grouping approach, or in combination with the numeric approach and/or the grouping approach. In the compression approach, data compression is used to compress Related Data 130, optionally Secondary Key 420, and optionally length information regarding Related Data 130. Any of the lossless compression algorithms known in the art of data compression may be used to compress these data. Overhead 110 and Primary Key 410 (or Numeric Representation 310) are typically not compressed. A typical compression algorithm uses approximately 50 bytes of overhead data and can compress NAPTR data by a factor of ten-to-one. Thus, independent of the grouping approach, the compression approach may be used to compress a 100-byte instance of Related Data 130 to 60 bytes (50+100/10 bytes), or a 60 byte instance of Related Data 130 to 56 bytes (50+60/10). This represents a 40 percent and a seven percent savings over the prior art, respectively.

In some embodiments, the compression approach is advantageously combined with the grouping approach. In these embodiments, Compressed Data 630 includes compressed instances of Related Data 130, e.g., Compressed Related Data 650, and optionally compressed instances of Secondary Key 420 and/or Length 425, e.g., Compressed Secondary Key/Length 640. Thus, when both the grouping and compression approaches are used in combination, both Overhead 110 and a Compression Overhead 620 can be shared by multiple instances of compressed embodiments of Secondary Key 420, Length 425 and Related Data 130, and the storage cost of Compression Overhead 620 is shared among several instances of Related Data 130.

The storage savings achieved by the combination of the grouping approach and the compression approach is greater than the product of the saving achievable using each approach alone. For example, in an embodiment wherein 256 instances of Compressed Related Data 650 and Compressed Secondary Key/Length 640 are included in Compressed Data 630, 84 bytes comprised of Overhead 110 (28 bytes), Primary Key 410 (6 bytes) and Compression Overhead 620 (50 bytes) are shared by 256 instances of Compressed Related Data 650. Assuming that each instance of Compressed Related Data 650 required 100 bytes before compression, each of these instances uses 0.33 bytes (84 shared bytes/256 instances) of overhead data, and 10.2 (102/10) bytes of Compressed Secondary Key/Length 640 and Compressed Related Data 650. This is a total of 10.5 bytes and a 93 percent improvement over the storage requirements of the prior art.

Figure 7:
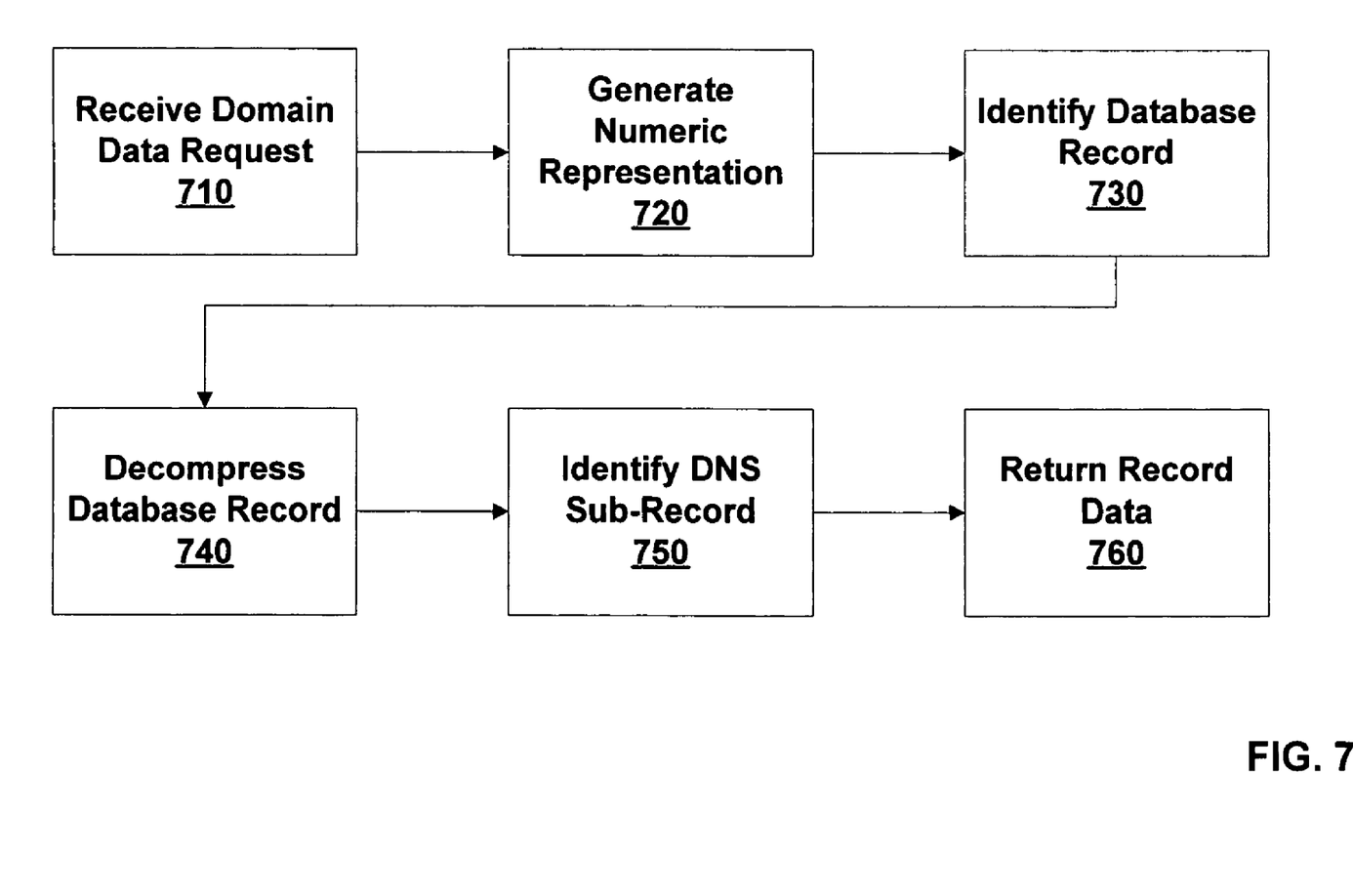
FIG. 7 illustrates methods, according to various embodiments of the invention.

FIG. 7 illustrates methods, according to various embodiments of the invention. In these methods, a request for DNS services is received by DNS System 200, and Server Logic 240 is used to generate one or more queries for Query Logic 210 to query DNS Database 220. The results of these queries are then used to respond to the received request for DNS services. Depending on the particular embodiment of Database Record 230 included in DNS Database 220, the illustrated methods may include generation of a numeric representation of a telephone number, identification of a DNS sub-record (e.g., a particular instance of Related Data 130 within a database record), and decompression of DNS data.

In a Receive Domain Data Request Step 710, DNS System 200 receives a request for DNS services (e.g., DNS data) from an external source. The request for DNS services may include, for example, a request for NAPTR data related to a domain name including a representation of a telephone number. The received representation of a telephone number may be in a format wherein each digit is represented by a separate DNS label, wherein parts of the telephone number are each represented by a DNS label, or wherein the entire telephone number is represented by a DNS label. The received representation may be alphanumeric or numeric. The telephone number optionally includes a country code, a city code, an area code, a prefix, an extension, or the like.

If the numeric approach is used and the telephone number is not already in a numeric format (e.g., stored as a numeric value), then the telephone number is converted from an alphanumeric format to a numeric format (e.g., from a character string to a numeric value) in a Generate Numeric Representation Step 720. Generate Numeric Representation Step 720 is typically performed by Server Logic 240 and may include parsing alphanumeric DNS labels to generate a binary, hexadecimal, decimal or other numeric value. Generate Numeric Representation Step 720 optionally further includes addition of a leading or trailing. non-zero value to the numeric representation. In some embodiments, the numeric representation generated in Generate Numeric Representation Step 720 is included in a query configured for querying DNS Database 220.

In embodiments including the grouping approach, Generate Numeric Representation Step 720 optionally includes generating a numeric representation of a first part of the telephone number and a numeric representation of a second part of the telephone number. The first part being configured for matching with an instance of Primary Key 410 to identify a specific instance of Database Record 230 within DNS Database 220, and the second part being configured for comparison with an instance of Secondary Key 420 to identify a sub-record within the identified instance of Database Record 230.

In an Identify Database Record Step 730, the representation of a telephone number generated in Generate Numeric Representation Step 720 is used to identify a specific instance of Database Record 230 within DNS Database 220. In some embodiments, Identify Database Record Step 730 includes the use of Query Logic 210 to execute a query, generated in Generate Numeric Representation Step 720, on DNS Database 220. In some embodiments, Identify Database Record Step 730 includes an alternative form of record identification, such as a hash table lookup or navigation through a structured set of data records.

If the grouping approach is used, Identify Database Record Step 730 optionally includes use of a data mask such that only part, e.g., the first part, of the representation of a telephone number is used to identify the instance of Database Record 230. For example, a mask may be used such that a first part of the representation can be used to identify Primary Key 410 while that part of the representation, that may later be used to identify Secondary Key 420, is ignored.

The result of Identify Database Record Step 730 includes identification of a particular instance of Database Record 230 within DNS Database 220. This instance is optionally read from DNS Database 220. For example, in some embodiments, Query Logic 210 is configured to retrieve the identified instance of Database Record 230, and store the retrieved instance in memory accessible by Server Logic 240 and/or Query Logic 210. In alternative embodiments, Query Logic 210 is configured to return a subset of Database Record 230 to Server Logic 240. As discussed further herein, Server Logic 240 can use Related Data 130 to respond to the request for DNS services received in Receive Domain Data Request Step 710. In alternative embodiments, Query Logic 210 is configured to return several instances of Secondary Key 420 and associated Related Data 130 to Server Logic 240.

In embodiments including the compression approach, a Decompress Database Record Step 740 is used to decompress all or part of the instance of Database Record 230 identified in Identify Database Record Step 730. If the grouping approach is used, the decompressed data includes a plurality of Related Data 130 and optionally a plurality of associated Secondary Key 420. The decompression is optionally performed using Server Logic 240 and decompression algorithms known in the art.

In embodiments including the grouping approach, an Identify DNS Sub-Record Step 750 is used to identify a particular instance of Related Data 130 within the Database Record 230 identified in Identify Database Record Step 730. In these embodiments, the identified Database Record 230 includes a set of Secondary Key 420 each associated with an instance of Related Data 130. Identify DNS Sub-Record Step 750 includes using a part of a representation of a telephone number to identify one member of the set of Secondary Key 420 and the associated instance of Related Data 130. The set of Secondary Key 420 and/or Related Data 130 optionally include data that was decompressed in Decompress Database Record Step 740.

The part of a representation of a telephone number used to identify Secondary Key 420 in Identify DNS Sub-Record Step 750 is typically a different part of the same representation that was used in Identify Database Record Step 730 to identify a particular Database Record 230. As in Identify Database Record Step 730, a mask is optionally applied to the representation of a telephone number in order to mask a particular part of the representation of a telephone number.

In some embodiments, Query Logic 210 is configured to execute a single query configured to both identify a specific instance of Database Record 230 and to identify a specific instance of Related Data 130 within the identified instance of Database Record 230. In these embodiments, Identify Database Record Step 730 and Identify DNS Sub-Record Step 750 can be combined into a single step.

In a Return Record Data 760, the Database Record 230 identified in the proceeding steps is parsed and data therein is used, if possible, to provide the DNS services requested in Receive Domain Data Request Step 710. For example, Return Record Data 760 may include sending NAPTR data, or other DNS data records, to an external device.

Several embodiments are specifically illustrated and/or described herein. However, it will be appreciated that modifications and variations are covered by the above teachings and within the scope of the appended claims without departing from the spirit and intended scope thereof. For example, the sizes of various data fields discussed herein may vary in further embodiments of the invention.

In some embodiments, instances of Secondary Key 420 can be inferred from a predefined data structure. For example, if Primary Key 410 is used to index the first 10 digits of an 11 eleven-digit telephone number, 10 instances of Related Data 130 may be included in each Database Record 230. These 10 instances correspond to values of 0-9 for the eleventh digit. Rather than using explicit instances of Secondary Key 420 to index these Related Data 130, a data structure may specify that the instance of Related Data 130 associated with the value of "0" for the eleventh digit will be found in the first 100 bytes of data, and the instance of Related Data 130 associated with the value of "1" for the eleventh digit will be found in the following 100 bytes, etc.

In some embodiments, the lengths of Related Data 130 within Database Record 230 may be variable. For example, Database Record 230 may include length data stored in Length 425 and indicative of Related Data 130. Each length data is optionally associated with an instance of Secondary Key 420. Alternatively, an instance of length data may be included for every possible Secondary Key 420 and every possible Secondary Key 420 need not be included in Database Record 230. For example, one embodiment includes 10 length values, one for each of ten possible (but not required) instances of Secondary Key 420 correspond to values of 0-9 for the eleventh digit of a telephone number. A length value of zero is optionally used to indicate that there is no Related Data 130 associated with a particular possible Secondary Key 420. Thus, if there is Related Data 130 related to an eleventh digit value of "0" and no Related Data 130 related to an eleventh digit value of 1, the first length value may be non-zero and the second length value may be zero.

In some embodiments, Database Record 230 may include a field used to store data indicative of which instances of Related Data 130 are present. For example, a bit pattern of 1001001101 can be used to indicate that instances of Related Data 130 corresponding to the values of "0," "3," "6," "7," and "9" for the eleventh digit are present in a particular instance of Database Record 230. If the length of each instance of Related Data 130 is known, a plurality of Secondary Key 420 can be inferred from the bit pattern.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

The invention claimed is:

1. A system comprising:
   a DNS database including a plurality of database records each including a primary key including a first portion of a telephone number and configured to identify a different particular member of the plurality of database records, a at least one member of the plurality of database records including a plurality of secondary keys each including a second portion of a telephone number and configured to index different DNS data within the member of the plurality of database records, each of the different DNS data being related to a different telephone number that corresponds to the combination of the primary key and a secondary key;
   server logic configured to receive a request for DNS data, the request including a representation of a telephone number; and
   query logic configured to identify the member of the plurality of database records including the plurality of secondary keys using a first part of the telephone number and to identify a member of the different DNS data using a second part of the telephone number.

2. The system of claim 1, wherein the different DNS data include NAPTR data.

3. The system of claim 1, wherein the primary key is stored as a numeric value.

4. The system of claim 3, wherein the server logic is further configured to convert the representation of a telephone number to a numeric value for comparison with the primary keys.

5. The system of claim 1, wherein each of the different DNS data being related to a different telephone number comprises ten or more separate DNS data each associated with a different one of ten or more telephone numbers.

6. The system of claim 1, wherein the different DNS data share storage overhead associated with the member of the plurality of database records including the plurality of secondary keys.

7. The system of claim 1, wherein each of the plurality of secondary keys require less storage space than the primary key.

8. The system of claim 1, wherein the different DNS data are stored in the DNS database as compressed data, and the server logic is further configured to decompress the DNS data.

9. The system of claim 8, wherein the primary key is stored in a non-compressed form.

10. The system of claim 8, wherein the plurality of secondary keys are stored in a numeric value.

11. The system of claim 1, wherein the server logic is further configured to decompress the different DNS data or the plurality of secondary keys when the different DNS data or the plurality of secondary keys are compressed.

12. The system of claim 11, wherein the different DNS data share data compression overhead.

* * * * *